United States Patent [19]

Jalan et al.

[11] 4,136,059

[45] Jan. 23, 1979

[54] METHOD FOR PRODUCING HIGHLY DISPERSED CATALYTIC PLATINUM

[75] Inventors: Vinod M. Jalan, Manchester; Calvin L. Bushnell, Glastonbury, both of Conn.

[73] Assignee: United Technologies Corporation, Hartford, Conn.

[21] Appl. No.: 859,334

[22] Filed: Dec. 12, 1977

[51] Int. Cl.$^2$ .......................... B01J 21/18; B01J 23/42
[52] U.S. Cl. ..................................... 252/447; 252/472
[58] Field of Search ..................... 252/425.3, 447, 460, 252/466 PT, 472

[56] References Cited

U.S. PATENT DOCUMENTS

| 3,956,469 | 5/1976 | El-Ghatta et al. | 252/472 X |
| 4,031,292 | 6/1977 | Hervert et al. | 252/425.3 |

Primary Examiner—W. J. Shine

[57] ABSTRACT

Method for the production of highly dispersed electrochemically active platinum particles having an average diameter below about 50 Å for use in electrodes for fuel cells. Platinum particles are formed by mixing chloroplatinic acid and sodium dithionite in water to provide a platinum containing colloidal dispersion which may be absorbed on a support material. Hydrogen peroxide can be mixed with the chloroplatinic acid and sodium dithionite to improve the stability of the platinum containing colloidal dispersion.

32 Claims, No Drawings

METHOD FOR PRODUCING HIGHLY DISPERSED CATALYTIC PLATINUM

BACKGROUND OF THE INVENTION (1) Field of the Invention

This invention relates to methods for the preparation of platinum containing colloidal dispersions and methods for adsorbing such dispersions to a support material which may be used in an electrode for a fuel cell.

(2) Description of the Prior Art

Catalytic activity of a platinum catalyst will, as a general rule, increase with the increasing surface area of platinum. To achieve the increased surface area, it is necessary to prepare platinum catalyst in a finely divided form, that is, platinum catalyst having an average diameter below about 50 Å.

It is known to prepare platinum catalysts in a number of ways: the most common methods are direct adsorption and precipitation. Chloroplatinic acid is one of the least expensive forms of platinum. Chloroplatinic acid does not adsorb directly on carbon black, a support material, in appreciable quantities.

Precipitation by slow reduction of chloroplatinic acid is a commonly employed approach. Bond, (Trans. Farady Soc., 52, 1235 (1956)) prepared 15 Å particle size platinum using sodium citrate. Barber (U.S. Pat. No. 3,440,107), Arcano (U.S. Pat. No. 3,457,116), Turkevich et al (Science, 169, p. 873, 1970), and Bryce-Smith et al (German Pat. No. 2,117,439) used respectively silanes, alcohols, tartarates and napthalides, to produce high surface area platinum catalysts.

More recently, Petrow (U.S. Pat. Nos. 4,044,193; 3,992,512 and 3,992,331) obtained similar results using elaborate and complex recipes involving formation of a platinum sulfite complex acid as an intermediate followed by oxidation treatment to produce a substance containing platinum from chloroplatinic acid.

Although the above-mentioned literature discloses methods which are said to provide fine platinum particles, the methods require elaborate and complex steps or require relatively expensive reactants.

It is one object of the present invention to provide a method of making highly dispersed platinum having an average diameter below about 50 Å, preferably below about 25 Å. It is another object to provide highly dispersed platinum that is capable of being readily adsorbed on a support material.

It is another object of the present invention to provide a simplified method of obtaining the desired platinum particles and to use relatively inexpensive reactants.

It is another object of the present invention to provide a method of making a platinum catalyst adsorbed to support material made of carbon.

SUMMARY OF THE INVENTION

The present invention provides a method for the production of platinum containing colloidal dispersions comprising mixing chloroplatinic acid and sodium dithionite to form highly dispersed platinum sol which may be adsorbed to a support material such as carbon.

In an alternative embodiment of the present invention chloroplatinic acid and sodium dithionite are reacted in the presence of hydrogen peroxide. The presence of hydrogen peroxide provides for the production of a stable colloidal dispersion, and, in general, a more highly dispersed platinum.

In another embodiment of the present invention the platinum catalyst on support material is prepared in situ by forming an aqueous suspension of support material and then adding chloroplatinic acid, hydrogen peroxide and sodium dithionite.

In accordance with the present invention, platinum particles are provided having uniform particle size distribution below about 50 Å, generally an average particle size below about 25 Å.

DETAILED DESCRIPTION OF THE INVENTION

An aqueous solution of chloroplatinic acid is formed, preferably having a concentration of about 5 to about 100 g/l. At concentrations above about 100 g/l, the reaction system becomes too concentrated and the particle size of the platinum may exceed the desired size. At concentrations below about 5 g/l the system becomes too voluminous for practical considerations such as handling and economics. It should be understood that this concentration range may vary due to varying parameters of reaction system such as temperature and concentrations of other reactants.

Although chloroplatinic acid is the preferred source of platinum, salts of chloroplatinic acid such as sodium salt may also be used.

An aqueous solution of sodium dithionite is mixed with the aqueous solution of chloroplatinic acid to form a platinum containing colloidal dispersion having an average particle size of less than about 50 Å, generally below about 25 Å. The aqueous solution of chloroplatinic acid is a yellow-orange clear solution and the aqueous solution of sodium dithionite is a light yellow clear solution. When the aqueous solution of sodium dithionite is mixed with the aqueous solution of chloroplatinic acid, the solution turns a dark burnt-orange but remains clear.

Although the ratio of chloroplatinic acid to sodium dithionite should be any ratio that provides platinum containing particles having an average diameter less than about 50 Å, it is particularly preferred that the ratio be in the range of about 2:1 to about 1:5. Above 2:1, all the chloroplatinic acid may not be reacted; below about 1:5, sodium dithionite may be wasted. It is preferred that the aqueous solution of sodium dithionite have a concentration range between about 10 and about 100 g/l.

It has been determined that the chloroplatinic acid and sodium dithionite reaction provides a colloidal dispersion of platinum that tends to destabilize over a period of time. At large times, that is, several days, the colloidal dispersion shows signs of sediments, indicating that the size of the platinum containing particles are growing in excess of the desired size.

It has been found that the addition of hydrogen peroxide to the reaction system provides a more stable colloidal dispersion. The hydrogen peroxide may be added to the chloroplatinic acid solution before or soon after the sodium dithionite. Hydrogen peroxide should be added in an amount sufficient to stabilize the colloidal dispersion of platinum. It is particularly preferred that the hydrogen peroxide be added in an amount in the range of about 2 cc to about 5 cc of 30 v/o $H_2O_2$ per gm. of chloroplatinic acid. Any concentration of hydrogen peroxide can be added in an equivalent amount.

The chloroplatinic acid, sodium dithionite and hydrogen peroxide reaction should be carried out at a temperature sufficient to provide a reasonable percentage conversion of the chloroplatinic acid in small enough time. It is preferred that the reaction be carried at temperatures, such as in the range from about 20° C to about 80° C, most preferably from about 45° C – 65° C. At temperatures below about 45° C the reaction takes an extended length of time for near completion, that is, the conversion of at least about 90 weight percent of the platinum to a form that can be adsorbed. At temperatures above about 80° C the mixture of chloroplatinic acid, sodium dithionite and hydrogen peroxide tends to become a cloudy brown-black, rather than clear brown-black, indicating that the desired particle size has been exceeded. Although the above temperature range has been found to be preferable, is should be understood that this range may vary due to varying parameters of the reaction system such as concentration of the reactants.

The platinum containing dispersions produced by the above described methods are of unknown composition. However, since sodium dithionite is capable of readily reducing a large number of metal ions to the metal, and since catalysts formed using the platinum containing dispersions of the present invention are electrocatalytically active without any further reduction, that is, reduction in a high temperature, $H_2$ environment, it is likely that dispersed in the dispersion are very fine particles of platinum metal.

The aqueous mixture of chloroplatinic acid, sodium dithionite and optionally, hydrogen peroxide, provides a platinum containing colloidal dispersion having an average particle size below about 50 Å, generally below about 25 Å. The platinum dispersion may then be adsorbed onto a support material in any conventional manner. Preferably, the support material is added in an aqueous suspension form. The platinum catalyst adsorbed on the support material is separated from aqueous medium by any conventional means such as by filtering. The platinum catalyst adsorbed on support material may then be dried to provide a dry powder form.

Alternatively, the platinum catalyst may be adsorbed onto a support material by an in situ method. In this in situ method, the support material is mixed with water to provide an aqueous suspension of support material. Subsequently, chloroplatinic acid, sodium dithionite and optionally, hydrogen peroxide are added to the aqueous mixture.

The support material performs several important functions. It provides bulk to the catalyst, making it practical to fabricate structure containing very small quantities of the platinum. It allows one to obtain much higher platinum surface areas than are attainable with unsupported platinum catalyst.

High surface area carbon blacks with high electrical conductivity make excellent catalyst supports for fuel cell electrodes. However, it is believed that supported high surface area platinum catalyst can be prepared by this method using any conventional catalyst support materials such as alumina, silica and charcoal for other chemical reactions in which platinum is a catalyst.

It has been determined that at least about 90 weight percent of the platinum contained in the chloroplatinic acid can be adsorbed to the carbon support material. This weight percentage is calculated by taking the mass of platinum contained in the chloroplatinic acid originally added and comparing this mass with the mass of platinum adsorbed to the carbon support material.

Electron micrography has revealed that the platinum containing particles adsorbed to the carbon support material had an average diameter of less than about 50 Å, generally less than about 25 Å. The electron microscope revealed particle sizes as low as 5 Å, the lower limit of resolution of the electron microscope used. It is believed that particle sizes below about 5 Å are provided by the present invention. The low particle sizes were further substantiated by electrochemical surface area measurements that showed 140 to 215 $m^2/gm$ of platinum which corresponds to mean platinum particle sizes of 20 to 13 Å.

EXAMPLES

The following examples are detailed examples showing the process of the present invention.

EXAMPLE 1

One gram of chloroplatinic acid was dissolved in 0.1 liters of water at room temperature, about 20° C. 20 ml of 100 g/l aqueous solution of sodium dithionite was added slowly and continuously. The chloroplatinic acid, an orange-yellow clear solution, when mixed with the aqueous solution of sodium dithionite, a light yellow, clear solution, produced a platinum containing colloidal dispersion which had a dark burnt orange-brown clear appearance. Upon standing for about 4 days, a small portion of the dispersed particles settled out of the platinum containing colloidal dispersion.

However, it was found that a freshly made platinum containing dispersion readily adsorbed on carbon support material. 2.6 gms. of carbon black, VULCAN XC-72, sold by Cabot Corp., suspended in 250 ml of water was added to a freshly made platinum containing dispersion to provide a platinum catalyst supported on carbon.

EXAMPLE 2

One gram of chloroplatinic acid was dissolved in 0.1 liters of water and was heated to a temperature of about 60° C. Four ml of 30 volume percent of hydrogen peroxide was added. To this mixture 20 ml of 60 g/l aqueous solution of sodium dithionite was added slowly and continuously over a period of fifteen minutes. The chloroplatinic acid, an orange-yellow clear solution, when mixed with the aqueous solution of sodium dithionite, a light yellow clear solution, in the presence of hydrogen peroxide produced a platinum containing colloidal dispersion which had a dark brown-black clear appearance. 2.6 grams of carbon black, VULCAN XC-72, sold by Cabot Corp., was suspended in 0.25 liters of water and was added to the above mixture. A platinum catalyst supported on a carbon material was formed. The dispersion of platinum catalyst supported on carbon was filtered and the retent was dried at 70° C to provide a platinum catalyst supported on carbon in powdered form.

Electron micrography revealed a uniform size distribution for the platinum particles of about 5 to about 20 Å. About 95 weight percent of the platinum was adsorbed to the carbon material.

EXAMPLE 3

Example 3 demonstrates the in situ process of providing a platinum catalyst on a carbon support material.

2.6 grams of carbon black, VULCAN XC-72, sold by Cabot Corp., was suspended in 250 ml of water. To this mixture 50 ml of aqueous solution containing one gram of chloroplatinic acid was added and the mixture was heated to 45° C. 4 ml of 30 volume percent hydrogen peroxide was added and then 50 ml of 30 g/l aqueous solution of sodium dithionite was added slowly and continuously.

A platinum catalyst supported onto carbon was provided. Electron micrography revealed a uniform size distribution of platinum particles of about 5 to about 20 Å. About 95 weight percent of the platinum was adsorbed to the carbon material.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. A method for producing a highly dispersed platinum containing dispersion comprising: mixing in an aqueous medium chloroplatinic acid or a salt thereof and sodium dithionite to provide a dispersion of platinum containing particles.

2. A method according to claim 1 wherein said particles have an average diameter of less than 50 Å.

3. A method according to claim 2 wherein said chloroplatinic acid or salt thereof and said sodium dithionite are mixed in a weight ratio of about 2:1 to about 1:5.

4. A method according to claim 3 wherein said method is carried out at a temperature between about 20° C and 80° C.

5. A method according to claim 4 wherein said chloroplatinic acid or salt thereof is added in an aqueous solution having a concentration range of about 5 to about 100 g/l.

6. A method according to claim 5 wherein said sodium dithionite is added in an aqueous solution having a concentration range of about 10 to about 100 g/l.

7. A method for producing a highly dispersed platinum containing dispersion comprising:
   (a) forming an aqueous solution of chloroplatinic acid or a salt thereof; and
   (b) adding hydrogen peroxide and an aqueous solution of sodium dithionite to solution (a) to form a highly dispersed platinum containing dispersion comprising platinum containing particles having an average diameter of less than about 50 Å.

8. A method according to claim 7 wherein said chloroplatinic acid or salt thereof and said sodium dithionite are mixed in a weight ratio of about 2:1 to about 1:5.

9. A method according to claim 7 wherein said hydrogen peroxide is added to said (a) solution prior to the addition of said aqueous solution of sodium dithionite.

10. A method according to claim 7 wherein said aqueous solution of sodium dithionite is added to said (a) solution prior to the addition of said hydrogen peroxide.

11. A method according to claim 8 wherein said method is carried out at a temperature between about 20° C and 80° C.

12. A method according to claim 11 wherein said chloroplatinic acid or salt thereof is in a concentration range of about 5 to about 100 g/l.

13. A method according to claim 12 wherein said sodium dithionite is in a concentration range of about 10 to about 100 g/l.

14. A method for producing a platinum catalyst on a support material for use in fuel cells comprising:
   (a) mixing an aqueous solution of chloroplatinic acid or a salt thereof and an aqueous solution of sodium dithionite thereby providing a highly dispersed platinum containing dispersion;
   (b) adsorbing said dispersion on a support material to provide a platinum catalyst on a support material; and
   (c) separating the platinum catalyst on a support material from the aqueous solution.

15. A method according to claim 14 wherein hydrogen peroxide is added to said aqueous solution of chloroplatinic acid or salt thereof prior to the addition of sodium dithionite.

16. A method according to claim 14 wherein hydrogen peroxide is added to said aqueous solution of chloroplatinic acid or salt thereof subsequent to the addition of sodium dithionite.

17. A method according to claim 14 wherein said support material is carbon black.

18. A method according to claim 17 wherein said platinum containing dispersion is adsorbed to said carbon black by mixing an aqueous suspension of said carbon black with said platinum containing dispersion.

19. A method according to claim 18 wherein said chloroplatinic acid or salt thereof and said sodium dithionite are mixed in a weight ratio of about 2:1 to about 1:5.

20. A method according to claim 19 wherein said method is carried out at a temperature between 20° C and 80° C.

21. A method according to claim 20 wherein said chloroplatinic acid or salt thereof is in a concentration range of about 5 to about 100 g/l.

22. A method according to claim 21 wherein said sodium dithionite is in a concentration range of about 10 to about 100 g/l.

23. An in situ method of producing a platinum catalyst on a support material comprising:
   (a) forming a mixture of water and a support material;
   (b) adding to said (a) mixture chloroplatinic acid and sodium dithionite to provide a platinum catalyst on a support material; and
   (c) separating the platinum catalyst on the support material from the water.

24. A method according to claim 23 wherein hydrogen peroxide is added to said aqueous solution of chloroplatinic acid or salt thereof prior to the addition of sodium dithionite.

25. A method according to claim 23 wherein hydrogen peroxide is added to said aqueous solution of chloroplatinic acid or salt thereof subsequent to the addition of sodium dithionite.

26. A method according to claim 23 wherein said support material is carbon black.

27. A method according to claim 26 wherein said chloroplatinic acid or salt thereof and said sodium dithionite are mixed in a weight ratio of about 2:1 to about 1:5.

28. A method according to claim 27 wherein said method is carried out at a temperature between about 20° C and 80° C.

29. A method according to claim 28 wherein said chloroplatinic acid or salt thereof is added in an aqueous solution having a concentration range of about 5 to about 100 g/l.

30. A method according to claim 29 wherein said sodium diothionite is added in an aqueous solution having a concentration range of about 10 to about 100 g/l.

31. A method according to claim 14 wherein step (c) comprises filtering the platinum catalyst on support material from the water and drying the platinum catalyst on support material.

32. A method according to claim 23 wherein step (c) comprises filtering the platinum catalyst on support material from the aqueous solution and drying the platinum catalyst on support material.

* * * * *